Figure 1:
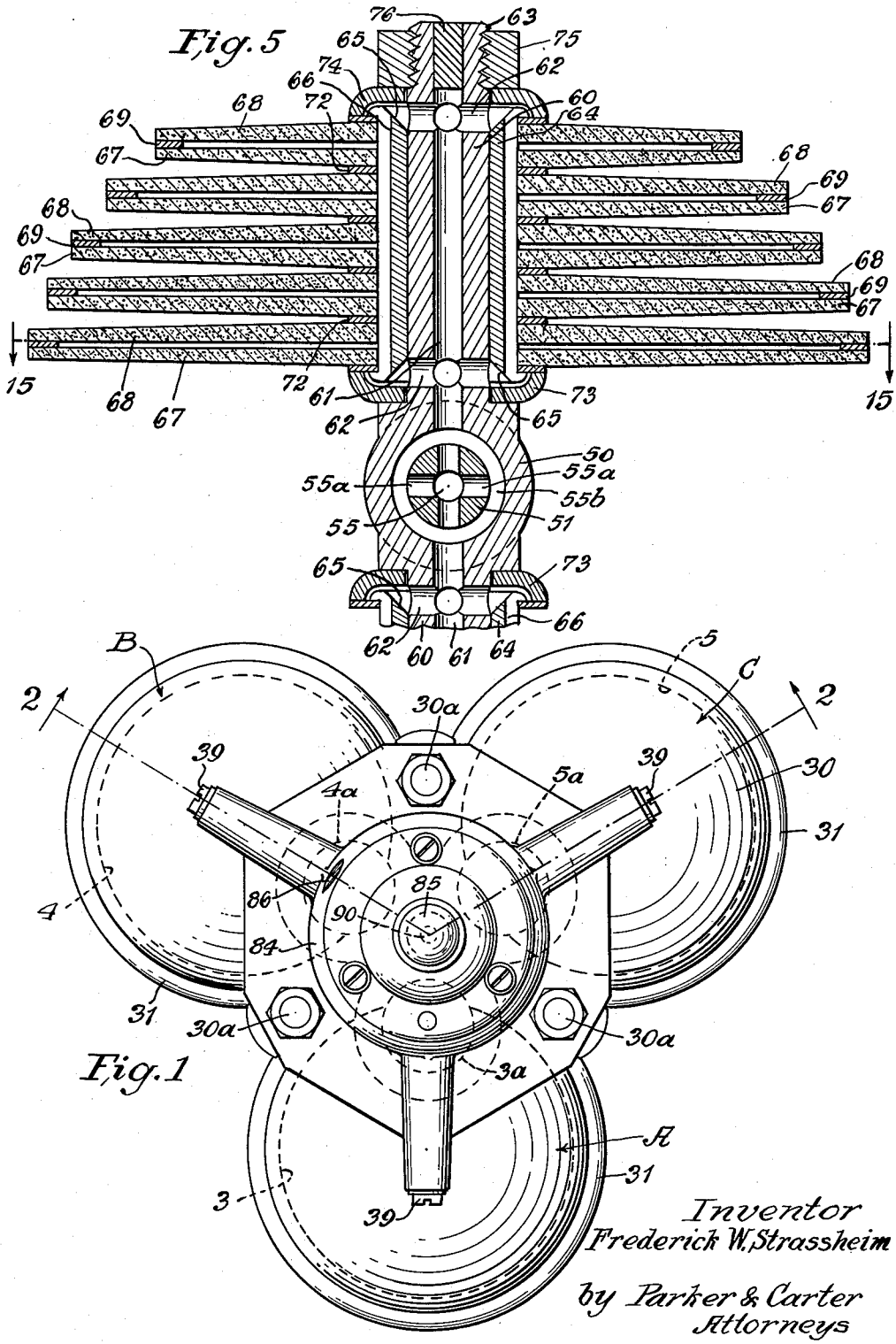

April 4, 1961 F. W. STRASSHEIM 2,978,108
FILTERS
Filed Nov. 7, 1955 6 Sheets-Sheet 2

Fig. 2

Inventor
Frederick W. Strassheim
by Parker & Carter
Attorneys

April 4, 1961 F. W. STRASSHEIM 2,978,108
FILTERS
Filed Nov. 7, 1955 6 Sheets-Sheet 3

Inventor
Frederick W. Strassheim
by Parker & Carter
Attorneys

April 4, 1961  F. W. STRASSHEIM  2,978,108
FILTERS
Filed Nov. 7, 1955  6 Sheets-Sheet 4
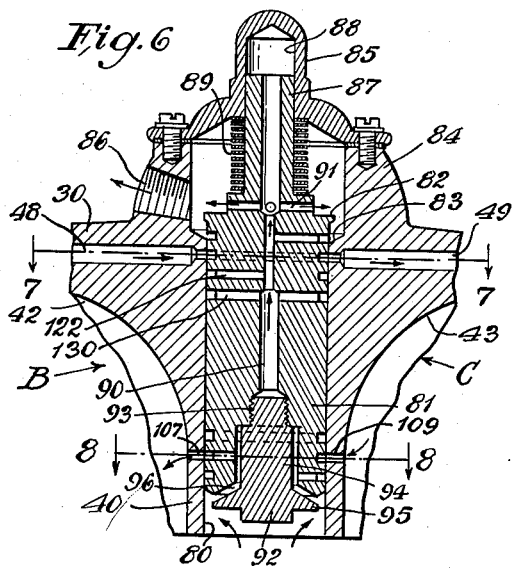
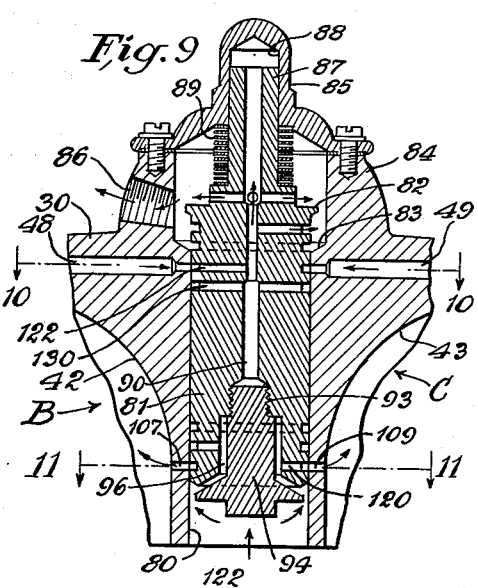
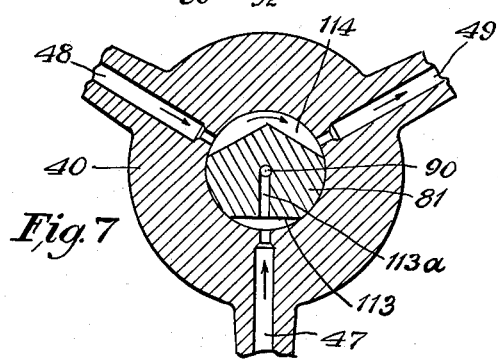
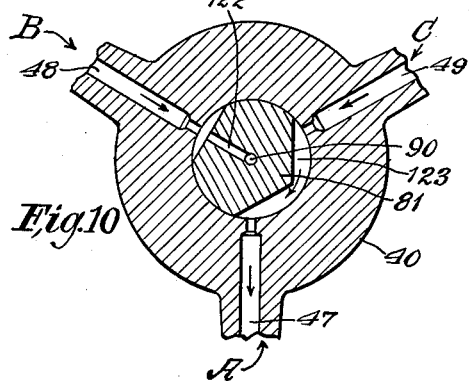
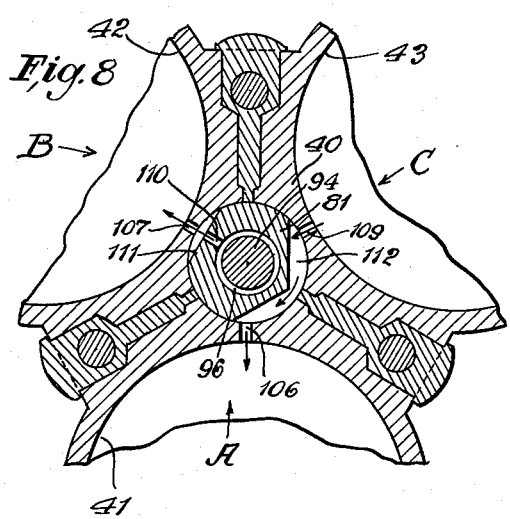
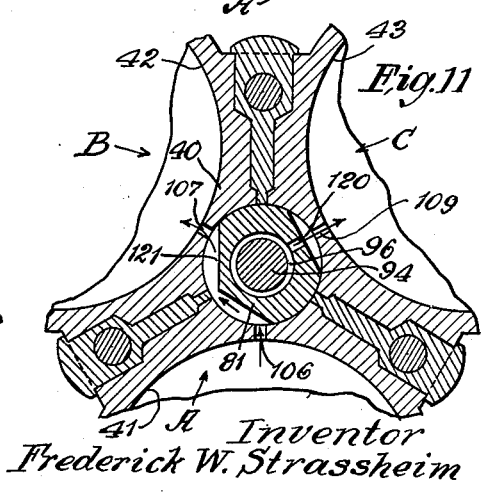
Inventor
Frederick W. Strassheim
by Parker & Carter
Attorneys April 4, 1961 F. W. STRASSHEIM 2,978,108
FILTERS
Filed Nov. 7, 1955 6 Sheets-Sheet 5

Inventor
Frederick W. Strassheim
by Parker & Carter
Attorneys

April 4, 1961 F. W. STRASSHEIM 2,978,108
FILTERS
Filed Nov. 7, 1955 6 Sheets-Sheet 6
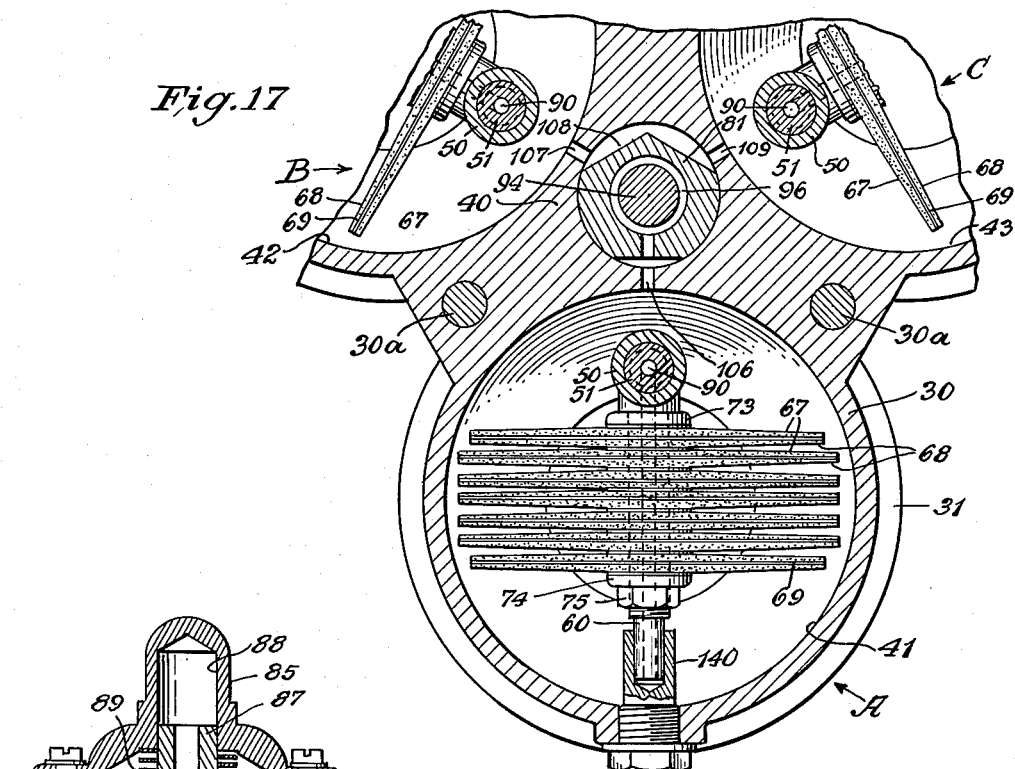
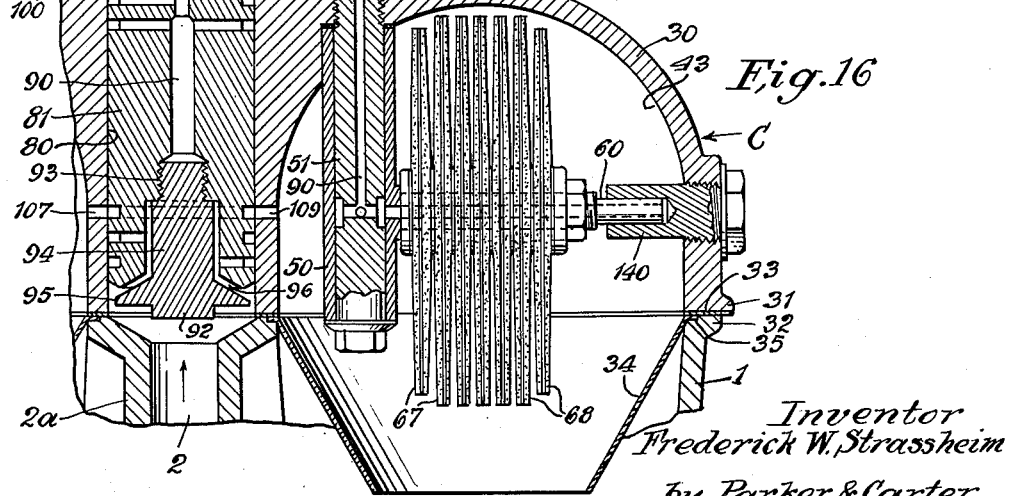
Inventor
Frederick W. Strassheim
by Parker & Carter
Attorneys

United States Patent Office 2,978,108
Patented Apr. 4, 1961

2,978,108
FILTERS
Frederick W. Strassheim, 2019 Wealthy SE.,
Grand Rapids, Mich.
Filed Nov. 7, 1955, Ser. No. 545,433
2 Claims. (Cl. 210—346)

My invention relates to an improvement in filters.
One purpose is to provide a filter particularly adaptable for use in filtering lubricants, such as lubricating oil used in internal combustion motors.

Another purpose is to provide a filter through which a stream of liquid to be filtered, such as oil for an internal combustion engine, may pass, and in which a plurality of individual filtering elements are employed, which, in the aggregate, prevent any damaging passage of impurities through and from a filter assembly.

Another purpose is to provide an improved filter assembly in which individual filter elements may be readily applied and from which they may readily be removed.

Another purpose is to provide an improved filter assembly in which a plurality of filter elements, or groups or assemblies of filter elements, operate in a line of flow of a lubricant to remove impurities from the lubricant; at least one of the filter groups being at all times operative to perform its filtering function between the outflow of the lubricant and the inflow and the remaining groups.

Another purpose is to provide a filtering assembly in which the filtering elements, or groups of elements, are cleaned in response to changes in the rate of flow of a liquid undergoing filtering.

Another purpose is to provide a filter assembly including a plurality of filter elements, or groups of elements, which successively or simultaneously perform a filtering function with means for changing the direction of flow of the liquid through individual filter elements or groups.

Another purpose is to provide a filter assembly which includes means for changing the order of flow of the liquid undergoing filtering through a plurality of individual filter elements or groups of filter elements.

Another purpose is to provide a control for such a filter assembly which is responsive to changes in pressure or movement of a liquid undergoing filtering.

Another purpose is to provide means for controlling such a filter assembly in response to changes in the pressure or flow of oil in the lubricating system of an automotive internal combustion motor.

Another purpose is to provide improved filter elements.

Another purpose is to provide ready means for removing sludge from a filter assembly.

Figure 4:
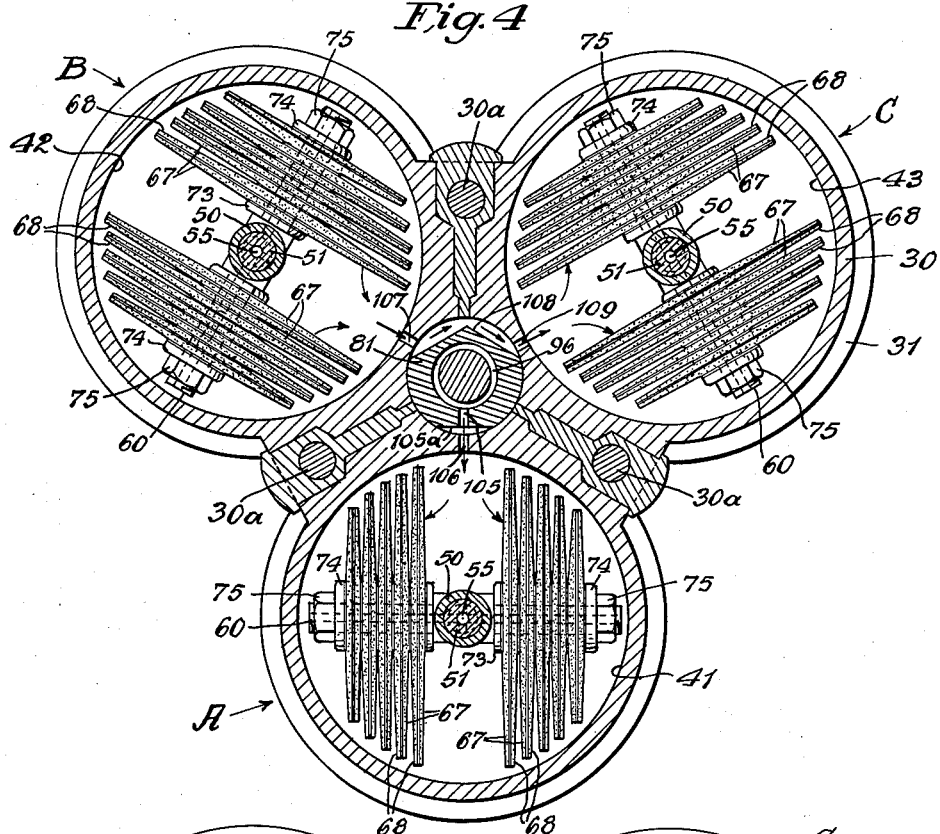
Figure 3:
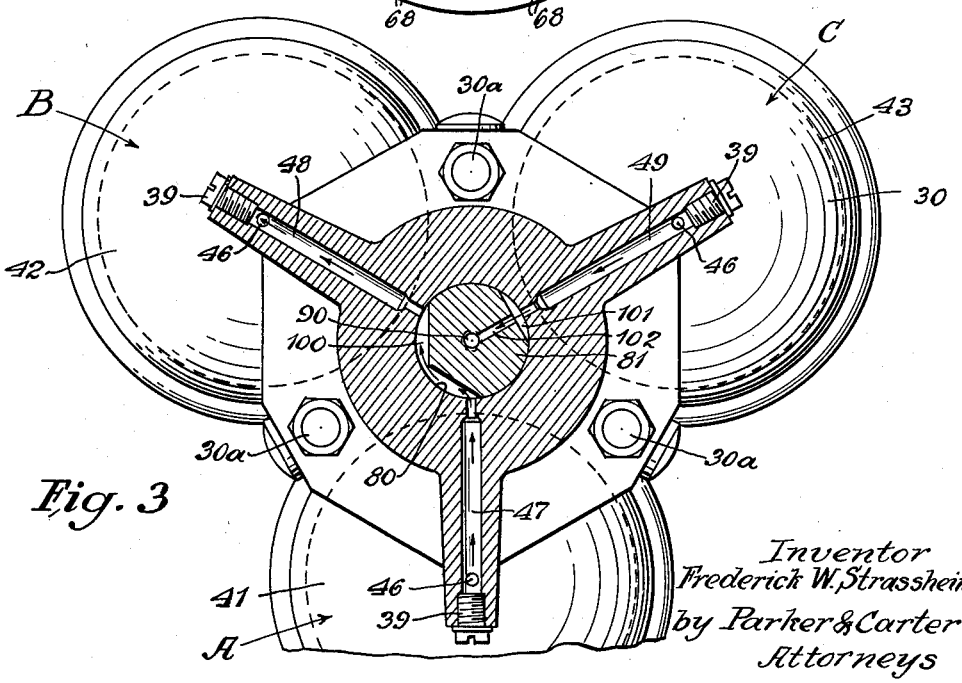
Figure 15:
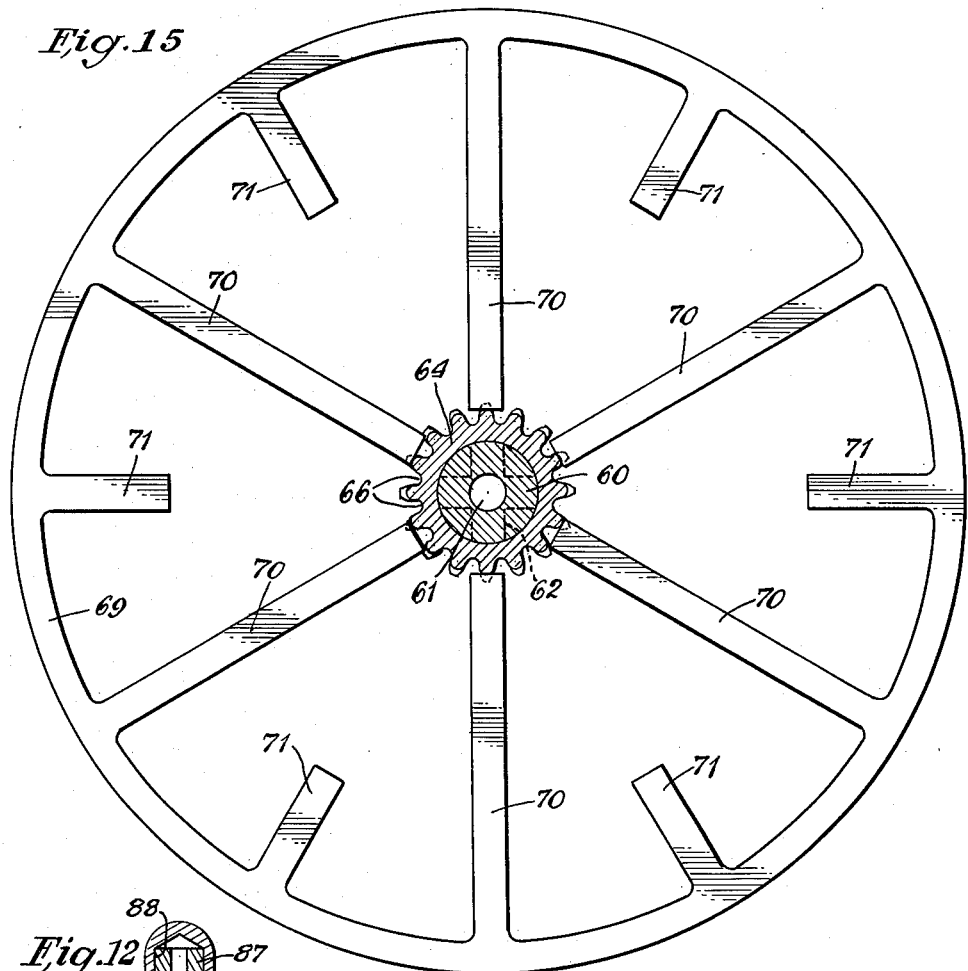
Figure 12:
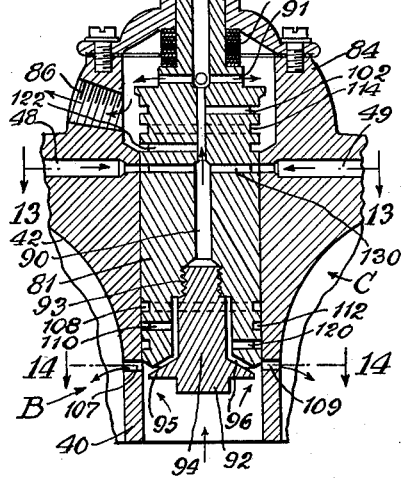
Figure 13:
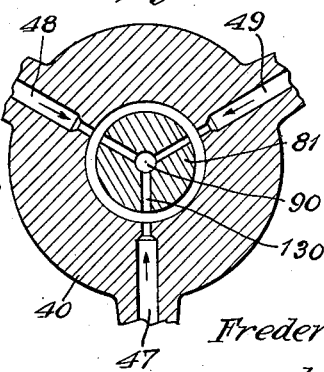
Figure 14:
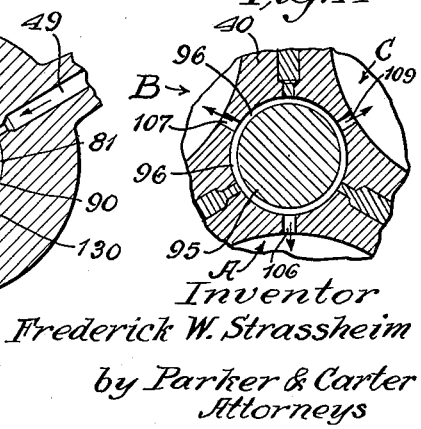

The invention is illustrated more or less diagrammatically in the accompanying drawings wherein:

Figure 1 is a plan view;
Figure 2 is a vertical section on the line 2—2 of Figure 1;
Figure 3 is a section on the line 3—3 of Figure 2;
Figure 4 is a section on the line 4—4 of Figure 2;
Figure 5 is a partial section on an enlarged scale on the line 5—5 of Figure 2;
Figure 6 is a vertical axial section similar to the upper part of Figure 2 but illustrating the parts in a different position;
Figure 7 is a section on the line 7—7 of Figure 6;
Figure 8 is a section on the line 8—8 of Figure 6;
Figure 9 is a section similar to Figure 6, illustrating a still different position of the parts.
Figure 10 is a section on the line 10—10 of Figure 9;
Figure 11 is a section on the line 11—11 of Figure 9;
Figure 12 is a section similar to Figure 6, but illustrating the parts in a still different position;
Figure 13 is a section on the line 13—13 of Figure 12;
Figure 14 is a section on the line 14—14 of Figure 12;
Figure 15 is a section on the line 15—15 of Figure 5, with parts omitted;
Figure 16 is a partial vertical axial section through a different form of the invention; and
Figure 17 is a partial section, similar to Figure 4, of the variant form of Figure 16.

Like symbols relate to like parts throughout the drawings and specification.

My invention is shown as embodying an oil filter assembly adapted for use with an internal combustion engine such as the motor used in an automobile. It will be understood, however, that it may be applied to a wide variety of problems, and its application to an internal combustion engine is intended to illustrate a practical application of the invention.

Engine speeds or oil pressures at which a change in the flow of oil takes place and at which oil flow to or through groups of filter elements is changed in direction or in order, can be widely varied.

Referring to the drawings, and particularly to Figure 1, the following, I illustrate a filter assembly which includes a lower housing portion 1, and an upper housing portion 30. Centrally located in the lower housing 1 as at 2a is an inlet passage 2 for the liquid to be filtered. Surrounding said passage 2 are three equally spaced individual sumps 3, 4 and 5, each of which is provided with a drain aperture 3a, 4a, and 5a. The lower portion of the passage 2 is screw-threaded as at 6 to receive the screw-threaded end of a sleeve 7 which is provided with an enlarged head 7a having a finger engaging flange 7b. The sleeve 7 is inwardly threaded as at 8 to receive any suitable fitting for supplying a flow of liquid to be filtered by the filter assembly later to be described. The sleeve 7 passes through a closure disc 10 which is forced upwardly into the position in which it is shown in Figure 2 to close the drain apertures 3a, 4a and 5a. A spring 11 located in a recess in the head portion 7a may assist in maintaining the member 10 in its desired upward position. The member 10 is outwardly channeled to engage a lower flange 12, on the lower housing portion 1. It will be understood that when the member 10 is released, the contents of the three sumps can readily be evacuated through the apertures thereby opened. The upper housing portion 30 has a circumferential edge or lip 31 opposed to the corresponding lip 32 of the lower member 1. Any suitable gasketing may be employed, such as a single gasket 33, which may be of copper or any suitable material, and compressed between portions 31 and 32. The upper housing 30 is secured to the lower housing by means of bolts 30a as illustrated in Figures 1, 3 and 4.

I illustrate also funnels 34 for each of the sumps, these funnels being indicated as having edges 35 seated about the upper edge of each sump. It will be understood that there is a separate funnel for each of the separated chambers 3, 4 and 5. The upper housing 30 includes also an integrally formed cylindrical valve sleeve 40, provided with a plurality of ports which will later be identified and described in detail.

Spaced around the valve sleeve 40 are the filter housings 41, 42 and 43, which are aligned respectively with the sludge chambers 3, 4 and 5. Each such filter housing has, generally on the axis of the sump which it overlies, a central enlargement or hollow projection 44 which is inwardly screw-threaded as at 45, and which communicates as at 46 with a radial passage 47, 48 or 49. These passages are formed in the integral upper housing portion 30, and may be radially inwardly drilled and thereafter closed at the outer ends by suitable closures 39, indicated as threaded members or plugs, as for example, in Figure 2.

It will be understood that the filter assemblies for the three sumps may be identical. Each such filter assembly includes an outer sleeve 50 and an inner stem 51. The inner stem is outwardly screw-threaded at its upper end as at 52, to seat within the enlargement 44 and the threads 45. The stem 51 has a downward enlarged head 52 with ledges 53 which engage the lower edge of the sleeve 50. The head is also conically surfaced as at 54 to co-operate with the funnel 34 within which it is centered.

It will be understood that when the stem 51 is tightened, it holds the sleeve 50 which may be provided with gaskets at each end. The upper part of each stem 51 is provided with an axial duct passage 55 which is in communication through an aperture 46 with one of the radial ducts 47, 48 or 49. This axial duct 55 communicates at its lower end with radial passage 55a which in turn extends to a circumferential recess 55b. The sleeve 50, in alignment with the passage 55b, has diametrically opposed radially extending arms 60, one of which is shown in detail in Figure 5. Each arm 60 has an axial passage or duct, which is aligned with a circumferential passage 55b about the stem 51. These ducts 61, in turn, have a plurality of branching radial ducts 62 arranged in groups at each end. The outer end of each stem 60 is outwardly screw-threaded as at 63.

A toothed or ribbed sleeve 64, which may be of pinion wire, extends about the exterior of each stem 60. Each end is bevelled, as at 65, to permit the flow of liquid to and from the radial passages 62. The inter-rib spaces 66 constitute longitudinal oil passages. About the exterior of the ribbed sleeve 64 are a plurality of abutting filter elements. Each filter element is formed of a pair of discs 67 and 68, the discs of each pair being spaced apart at their outer edges by the spacer structure shown in detail in Figure 15. This structure includes an outer ring 69, radial ribs 70, which extend inwardly to the sleeve 64, and shorter inward radial projections 71 which are located in the outer, or chordal, area of the pie shaped sectors formed by the radial ribs 70. It will be understood that the details of these spacers may be widely varied. The space between the two filters discs 67 and 68 is in communication with the inter-tooth space 66 and thus with the above described system of ducts.

The discs 67 and 68 are made of appropriate filtering material which may be, for example, of powdered metal or of ceramic or the like. Each individual pair of discs is separated by any suitable sealing spacers or gaskets 72. The group, as a whole, is held tightly in position by terminal clamps or washers 73 and 74, the clamp 74 being urged against the assembly by any suitable nut or tightening or locking member 75, threaded on the outer end of the stem 60. The axial bore 61 is closed at its outer end by any suitable plug 76.

It will thus be shown that I have provided three filter assemblies, each consisting of a plurality of pairs of filter discs, as shown in Figure 5, these assemblies being each one of them in communication with one of the radial ducts 47, 48 or 49. As the lubricant flows upwardly through the passage 2 it is directed to and through the above described filter elements or assemblies by the structure which will now be described in detail.

Defined in the sleeve portion 40, of the upper housing 30, is the cylindrical valve seat 80. Sliding in this cylindrical valve seat is the cylindrical valve body 81. This body is upwardly headed as at 82, to provide a circumferential limit having a bottom surface abutting against a top surface 83, of the interior of the hollow projection 84 which extends upwardly above the upper housing portion 30. This hollow projection is closed at its top by a cap 85 and has a generally radial or lateral outlet opening 86, through which the filtered liquid may flow. Upwardly extending from the valve body 81 is a cylindrical tubular portion 87, shown as of smaller diameter than the rest of the body, and as entering an appropriate bore 88 in the cap or closure 85. A spring 89 normally urges the valve body 81 downwardly in an abutting relation with the lower surface 83 of the interior of the enlargement 84.

The valve body 81 is formed with a plurality of internal passages and external passages, which enable it, at various positions of axial adjustment, to vary the direction of the flow of oil to and from the various above described filter assemblies or groups. As shown, for example, in Figure 2, these passages include an axial passage 90, an upper group of radial passages at the upper end of the valve body, and a lower group of radial passages at the lower end of the valve body. These radial passages communicate with peripheral passages or slots in the exterior of the valve body, which will later be described.

An example of the use of my invention is its application to a system where the axial movement of the valve body, and thus the changes in the direction of flow of the oil, caused by changes in position of these groups of passages, are responsive to changes in the oil pressure in the system. For example, when my system is applied to an automotive vehicle the oil pressures in the lubricating system of the vehicle motor, which vary at different speeds of the motor, vary the position of the valve body 81, as below set out. Upon minimum oil pressure, as shown in Figure 2, the spring 89 bottoms the valve body 81, and the flow of oil between the upper or discharge end of the valve body 81 and the individual filter assemblies or filter groups is as shown in Figure 3. At the same time, the oil connections provided between filter assemblies by the lower group of passages in the valve body are shown in Figure 4.

The operation of the valve body, and its internal and external passages, in varying the direction of flow of oil to and through the filter assemblies or groups, will now be described in greater detail.

At all positions of the valve body the axial duct 90, through the top branching ducts 91, is delivering oil to the space within the enlargement 84 and thus to the lateral outlet opening 86. The axial passage or duct 90 is closed at its lower end by a plug 92 which is internally screw-threaded at its upper end to be threaded into and secured to the valve body 81, as at 93. Below the screw-threaded portion the plug continues with a cylindrical enlargement 94 which terminates downwardly in a conical skirt 95. The space between the conical skirt 95 and the cylindrical valve sleeve 40 is, preferably, quite small, for example, approximately 1/32 of an inch, to prevent ingress of dirt consisting of hard carbon particles, etc., which could block the oil flow openings in the valve. The cylindrical portion 94 and the conic portion 95 are both inwardly spaced from surrounding parts of the valve body 81, as shown in Figures 2 and 12. This clearance constitutes a longitudinally and outwardly extending internal communicating passage 96 which receives inflowing oil from the duct or passage 2.

In Figures 2, 3 and 4, the valve body is shown at low pressure position, with the spring 89 holding the valve body flange 82 bottomed against the surface 83. Figure 3 illustrates the operation of the upper group of valve body ducts, and Figure 4 the operation of the lower group of valve body ducts, when the valve body is in the fully bottomed position of Figure 2.

Considering, first, the passages as shown in Figure 3, the oil is indicated as flowing inwardly along the radial passage 47 from a filter assembly indicated as A. In other words, the oil which previously was delivered to the sump 3, in which filter assembly A is located, has passed inwardly through the filter elements of that group or assembly, leaving foreign material on the outer surfaces of the filter elements. With the valve body in its lowest position, the oil is delivered inwardly along the duct 47 from the filter assembly A, flows about a partial external channel or slot 100 on the exterior of the valve body 81, and is thereby put in communication for outward flow along the radial passage 48 to the interior of the filter assembly B. The oil so delivered flows in a reverse direction, and is effective to clean the exterior surfaces of the filter elements of the assembly B. At the same time, oil which has passed inwardly through the filter elements of the group or assembly C flows radially inwardly along the duct 49, through a slot or peripheral passage 101 in the valve body, and thence by a radial passage 102 in the valve body to the axial passage 90. As above mentioned, it is thereby delivered by the uppermost radial passage 91 to the interior of the enlargement 84 and thus to the discharge aperture 86, from which it is delivered to any suitable point of use.

At the same time, the lower group of passages, as shown in Figure 4, maintains the proper connections to permit the above described flow. Referring in detail to Figure 4, oil flows from the circumferential passage 96 between the plug 92 and the rest of the valve body 81, through a radial passage 105 to a slot 105a and a radial passage 106 in the sump wall, to the exterior of the filter assembly A. This oil, after it has passed inwardly through the filter elements of the assembly A, flows inwardly, as above mentioned, through the radial passage 47 shown in Figure 3. The impurities are thus held upon the exterior surfaces of the discs, awaiting a later reversal of flow of oil through the discs. At the same time, oil which has flowed in a reverse direction through the discs of the filter assembly B, carrying removed foreign material, escapes through a radial passage 107, and through an outer passage or slot 108, to the radial passage 109, from which it flows through the space exterior to the filter elements of the group C. Thus the oil carrying the impurities from the exterior of the filter assembly B is now filtered by the filter assembly C. It is this filtered oil which flows inwardly through the radial passage 49, as shown in Figure 3, and thence flows to the outlet 86.

To summarize the operation, when the parts are in the position of Figure 2, oil travels upwardly through the inlet passage 2, and to the exterior of the filter elements of the assembly A. The oil which enters the filter assembly A, and is initially filtered, passes to the interior of the assembly B, and thus reverses the direction of filtering flow, and cleans the exterior of the discs of assembly B. This oil, however, is again filtered, since it flows to the exterior of the filter elements of group C, is there filtered, and escapes to the discharge passage after this final filtration.

Let us now assume an increase in engine speed, and thus an increase in pressure in the system, which elevates the valve body 81 to the position in which it is shown in Figure 6. This upward movement of the valve body puts a different set of passages in communication with the filter assemblies, the effective passages of the upper group being shown in Figure 7, and the effective passages of the lower group being shown in Figure 8. With the valve body in the position of Figures 6 to 8, inclusive, oil is initially delivered from the circumferential passage 96, through the radial valve body passage 110 and slot 111, and thence through the radial passage 107, into the interior of the filter assembly or group B, for passage inwardly through the filter elements of that group. The oil which passes inwardly through the filter elements of the group B is then delivered inwardly through the radial passage 48 and through the peripheral slot 114 in the valve body 81, to the radial passage 49, whence the initially filtered oil is delivered to the interior of the filter assembly C. This oil, in its reverse flow of direction, passes outwardly through the filter assembly C and into the surrounding sump, whence it flows through the radial passage 109 and the peripheral valve body slot 112, to the radial passage 106, which delivers the cleansing oil to the exterior of the filter elements of group A. The filtered oil, after it has passed therethrough, escapes through the radial passage 47 to the slot 113, and thence through the radial passage 113a to the axial passage 90 for its final escape from the filtering system. Thus, as in the position of Figures 2 to 4, inclusive, the oil passes inwardly through two groups of filters and outwardly through an intermediate group, the exterior of the filter elements of the intermediate group being thus cleaned, with the cleansing oil being thereafter filtered by the last group through which it passes, before escaping from the filter system.

Assume a further increase in engine speed, and thus in oil pressure, and a further compression of the spring 89. The valve body is thereby elevated, against compression of the spring 89, to the position in which it is shown in Figures 9, 10 and 11. At this stage oil from the circumferential duct 96 is delivered through the radial ducts 120 and 109, to the exterior of the filters of group C, for passage therethrough. At the same time, oil is flowing from the interior of the assembly or group A to the interior of the group B, through the radial duct 106, the exterior slot or passage 121 and the radial duct 107. Considering the upper passages, the filtered oil from the interior of the elements of group C flows inwardly along the radial passage 48, through the radial passage 122 from the valve body, and thus for delivery by the axial passage 90 to the discharge passage 86. However, the oil which thus escapes from the system has, before escaping, been initially filtered by the filter elements of group C, has thereafter flowed through the radial passage 49, the exterior passage 123, and the radial passage 47, to perform its cleansing function by a reverse flow through the filter elements of group A, and it is only after having passed in reverse direction through the filter elements of group A that it has flowed to the exterior of the filter elements of group B, for its final filtration before escaping through the radial passage 122 and the axial passage 90 of the valve body 81.

It will be clear, therefore, that as the pressure in the system increases, and the valve body 81 is moved against the compression of the spring 89, the oil is always initially filtered upon entering the first of the filter groups which it reaches, thereafter, at an intermediate stage, cleans the exterior of another group of filters, and, finally, is filtered by a third group of filters and escapes from the filtration system without carrying with it any impurities. The impurities which have been discharged from the exteriors of the individual filter groups by this reversal of direction of flow can always be removed through the bottom sump discharge apertures 3a, 4a or 5a by removal of the closure disc 10.

In the application of my invention to an automotive system, these various changes of direction of flow take place as the pressure in the system increases or diminishes. However, they all take place at pressures which, in the main, are less than the maximum pressure when the motor is at what may be called full speed. A maximum pressure, as when the car is traveling at a predetermined high speed, results in a further compression of the spring 89 and positions the valve body 81, as shown in Figure 12, in its highest possible position. In that position the circumferential passage 96, as shown in Figure 14, is delivering oil to each of the three sumps exterior to all of the filter units. Thus all of the filter groups are simultaneously filtering, and the filtered oil, as shown in Figure 13, is simultaneously inwardly delivered by all three groups to the three radial inlets 130, and thus to the axial passage 90 of the valve body 81. Thus, at full pressure, when an automotive engine is at high speed, all three units are simultaneously filtering, but at lower pressures and speeds, as when the engine is idling or accelerating or decelerating, there is a successive change in the direction of the flow of oil through the individual filter groups, which maintains an effective filtering action and prevents the escape of impurities from the filter system, while cleansing successively the exteriors of each filter group. At the three lower pressure positions, as indicated in Figures 2 to 11, inclusive, one filter group is always operating to filter the outflowing oil, while another filter group or assembly filters the inflowing oil, and a third group or assembly, between the first two, is being cleansed by a reverse flow of oil.

Whereas I have described and shown an operative device, it will be realized that many changes may be made in the size, shape, number and disposition of parts, without departing from the spirit of my invention. I therefore wish my description and drawings to be taken as illustrative, or diagrammatic, rather than as limiting me to my specific showing.

It will be noted, for example, that the size and location of the filter units may be widely varied. Thus, in Figures 16 and 17, I illustrate a variant form of my invention, in which a smaller number of pairs of filter discs are employed, but in which only two sizes of discs are employed instead of the five different sizes shown in the other figures. As a matter of fact, I may, if desired, employ but a single size of disc. Likewise, the location of the support for the discs and the means for delivery of the oil to the discs may be widely varied. In Figures 16 and 17 the surrounding sleeve 50, about the stem 51, carries only a single lateral extension about which the individual filter elements are positioned. In this event, I find it advantageous to receive the outer end of each stem 60 in a suitable bearing hub 140, which may be screw-threaded into the outer wall of the upper housing portion 30.

It will also be realized that the formation of the valve, such as a valve body 81, may be widely varied, together with the details of the passages. What I wish to provide is a simple means for readily varying the direction of the flow through individual filter elements or groups, so that at some stage of the operation of the system the direction of the flow of oil through each filter unit is reversed. I accomplish this result without at any time permitting a flow of this reversed oil to discharge directly from the filter system as a whole without being filtered by at least one of the filter groups or assemblies. Whereas I find the use of powdered metal highly desirable for my filter discs, I may also employ other material, for example, sheet metal with fine pores, or ceramic materials or the like.

Whereas I have shown filtering elements, each individual unit of which is formed of two pervious discs spaced apart to provide an inner cavity through which a liquid can flow, I may obtain the same result by providing a disc having an inner portion of somewhat coarser grain or porosity and outer portions of relatively finer grain or porosity. In that case the differential of the grain or porosity provides an interior avenue or space for the flow of the material undergoing filtering. A disc of this type may be formed of powdered metal of differential coarseness, with relatively thin outside layers of fine grain supported by an inner body or core of substantially coarser grain. The outer edge of a disc so formed must either have a fine grained layer or else be sealed. The coarse interior of the plate is left exposed at the axial or inner aperture of the disc. It should also be understood that, whereas the use of a separate spacer, as shown in Figure 15, may, in the main, be advantageous, I do not limit myself to the use of any such spacer. Two pervious discs may be directly connected about their edges, and may be suitably spaced apart. It will also be understood that, whereas I illustrate, in Figure 4, two groups of hollow discs or filter members, and, in Figure 17, a single group of such hollow members, I may find it advantageous to use a larger number of such groups in each compartment or cell of the filter housing.

When my invention is applied to the filtering of oil for an automotive motor or the like, I prefer to employ the variations in pressure of the oil, responsive to changes in the rate of operation of the motor, to cause the reversal of flow of oil through individual filter elements. However, it will be understood that I may employ other means to effect the changes in direction. For example, any suitable timing or control means may be employed, whether manual or automatically operated. Likewise, my invention is not limited to application to automotive systems, the automotive application being merely an example of an efficient employment of my invention.

I claim:

1. A lubricant filter unit for use in filtering assemblies in which space is at a premium and a maximum of filter units must be fitted into a given area such as an automotive internal combustion engine, said filter unit including, in combination, a pair of generally circular, generally flat powdered metal filtering discs, each disc being of substantially equal diameter and of substantially equal thickness at all relative locations on the disc, said discs being constructed and arranged to be positioned in face to face generally co-terminous relationship, the opposed, inner faces of said discs, when in said face-to-face relationship, being spaced an equal distance apart at all common, overlying points, each of said discs being formed with a center aperture of substantially equal diameter to thereby provide an unobstructed axial lubricant flow path through said discs and in communication with adjacent filter units when assembled in stacked relationship with a plurality of like filter units, and a metal spacer interposed between and maintaining said powdered metal discs an equal distance apart as aforesaid, the metal spacer being formed as a ring having its periphery co-terminous with the outer edges of the powdered metal discs, the ring extending radially inwardly only a distance sufficient to form a good bearing and bonding surface between the overlying edges of the discs, said metal spacer being bonded to the discs and having a number of narrow ribs extending radially inwardly to approximately the edge of the center apertures and being bonded throughout their length to the discs, said ribs serving to maintain the discs a fixed distance apart at all points and supplying a reinforcement to the discs resisting axial crushing stresses, said ribs being located at substantially equal peripheral distances apart about the ring.

2. The filter unit of claim 1 further characterized by and including a like number of projections extending radially inwardly from the ring portion of the metal spacer, each radially oriented projection being located approximately midway between a pair of adjacent ribs to thereby provide additional resistance to crushing in the chordal areas formed by the radial ribs.

References Cited in the file of this patent

UNITED STATES PATENTS

| | | |
|---|---|---|
| 1,408,785 | Torley | Mar. 7, 1922 |
| 2,088,199 | Gleason | July 27, 1937 |
| 2,165,931 | Levy | July 11, 1939 |
| 2,297,248 | Rudolph | Sept. 29, 1942 |
| 2,374,953 | Pickard | May 1, 1945 |
| 2,424,211 | Webb | July 15, 1947 |
| 2,473,979 | Walton | June 21, 1949 |
| 2,480,518 | Strassheim | Aug. 30, 1949 |
| 2,540,134 | Nelson | Feb. 6, 1951 |
| 2,592,972 | Strassheim | Apr. 15, 1952 |
| 2,697,524 | Foust | Dec. 21, 1954 |
| 2,731,152 | Redner | Jan. 17, 1956 |

FOREIGN PATENTS

| | | |
|---|---|---|
| 495,338 | Canada | Aug. 18, 1953 |
| 575,446 | Great Britain | Feb. 19, 1946 |
| 724,530 | Germany | Aug. 28, 1942 |